United States Patent [19]

Marchegiani

[11] 3,967,387
[45] July 6, 1976

[54] MOTION SIMULATOR

[76] Inventor: Daniel Marchegiani, 804 Bedford St., Fremont, Calif. 94538

[22] Filed: Oct. 21, 1974

[21] Appl. No.: 516,260

[52] U.S. Cl. .............................. 35/12 P; 248/371
[51] Int. Cl.² ............................................. G09B 9/08
[58] Field of Search .............. 35/12 K, 12 P, 12 S, 35/12 E, 12 W; 46/1 B, 1 H; 248/163, 188.1, 276, 277, 371, 424; 272/1 C, 31 A, 31 B

[56] References Cited
UNITED STATES PATENTS

| | | | |
|---|---|---|---|
| 3,215,391 | 11/1965 | Storm .................................. | 248/396 |
| 3,529,354 | 9/1970 | Roberts et al. ...................... | 35/12 P |
| 3,645,011 | 2/1972 | Callanen............................. | 35/12 P |
| R27,051 | 2/1971 | Cappel ................................ | 35/12 P |

FOREIGN PATENTS OR APPLICATIONS

| | | | |
|---|---|---|---|
| 1,224,505 | 3/1971 | United Kingdom ................. | 35/12 P |

OTHER PUBLICATIONS

Stewart, D.; "A Platform with Six-degrees of Freedom;" *Proc Instn Mech Engrs.;* vol. 180, Pt. 1, No. 15; 1966; pp. 371-386.

Kraus, R.; "Principles of the Systematic Gear Assembly;" *Verlag Technik*, East Berlin, Germany; 1952; pp. 155-164.

*Primary Examiner*—Richard C. Pinkham
*Assistant Examiner*—Vance Y. Hum
*Attorney, Agent, or Firm*—Leslie M. Hansen

[57] ABSTRACT

This invention relates to motion simulators that are used to impart controlled movement to a rigid platform which may support the student station of a vehicle simulator, or the like. In particular, my invention relates to an improvement in the geometric arrangement of actuators and actuator pivot points on such devices to provide better motion fidelity, improved simultaneous excursion capability, and better adaptability in accommodating visual display systems. A unique feature of this invention is an assembly of three linear actuators and six universal joints in the form of a tetrahedron, the apex of which is held fixed in space and the base of which is attached to and allowed to move with the movable platform. This final apex tetrahedron assembly can provide the platform with two rotational and one translational degrees of freedom, such as pitch, yaw and longitudinal motion, and can operate in conjunction with other movement producing elements to provide total motion capability in four, five or even six degrees of freedom.

8 Claims, 10 Drawing Figures

PITCH MOTION

FORE AND AFT

YAW MOTION

UP AND DOWN

ROLL MOTION

SIDE TO SIDE

MOTION SIMULATOR

BACKGROUND OF THE INVENTION

Attempts to provide generalized motion simulation through the use of electromechanical or hydromechanical apparatus have heretofore been proposed. Typical examples are illustrated by U.S. Pat. Nos: 3,619,911 issued on Nov. 16, 1971 to E. G. Pancoe, 3,529,354 issued on Sept. 22, 1970 to D. D. Roberts et al., 3,304,628 issued on Feb. 21, 1967 to L. Kaplan, 3,295,224 issued on Jan. 3, 1967 to K. L. Cappel, and 3,281,962 issued on Nov. 1, 1966 to E. G. Pancoe. Observation of these prior inventions reveal two general categories or types of motion system designs. These two types are referred to, by those familiar in the art, as the synergistic and cascaded types of motion systems. The synergistic type systems as examplified in Roberts et al. U.S. Pat. No. 3,529,354 are characterized by a single movable platform, wherein pure movement of this platform and its payload in any axis of motion requires a coordinated effort from a plurality of actuators. The cascaded type motion systems as examplified by the E. G. Pancoe et al. U.S. Pat. No. 3,619,911 are characterized by multiple stages of movable platforms, gimbals, guides, or the like, wherein pure movement of the principal platform and its payload in any axis of motion requires an effort from a single actuator. In addition to the synergistic or cascaded categorization, these prior inventions can also be categorized by the number of degrees of freedom which they can provide. Some systems can provide only two or three degrees of freedom to a platform, while others can provide four, five, or even the full compliment of six degrees of freedom.

Several design goals have been common to all motion systems employed in vehicular flight simulators used to train students. The first of these goals has been that the movement provided in each axis of freedom have sufficient excursion, velocity and acceleration capability and be sufficiently controllable to reproduce, with realistic time delays, the frequencies and amplitudes of those accelerations which would be imparted to the actual vehicle flight compartment. Sufficiently controllable meaning within the tolerance of human perception.

Another goal has been that the movement provided in each axis be smooth enough to control the gradual truncation of acceleration cues and the application of subliminal position and velocity washouts. Other common objectives of motion systems have been that they be mechanically failsafe, wherein the members of the system will not mechanically interfere with one another and the movable platform will not collapse or move into a position in which it cannot return. Some of the more recent motion systems have had an objective of accommodating various visual display systems.

The major problems associated with prior motion systems have been due to their inability to control the movement of a platform and its payload within the tolerance of human perception of what is generally defined as motion noises. This perceivable motion noise is commonly referred to as "false cues", since they have no counterpart in the real vehicular flight environment. The cause of this noise can be related to the electronic control circuitry and the computer drive equations, but more often is related to structural spring reactions of the mechanical elements of the system and to the load variations on the system actuators. Many of the prior system designs assumed the movable platform and other mechanical components to be perfectly rigid. They also assumed the actuators to be unaffected by load variation throughout their range of extention and retraction. In system applications where the moving payload has been light and small in size, and where the required acceleration levels in each axis have been low, these assumptions proved to be acceptable. However, the trend in flight simulation has been to increase the weight of the movable payload due to requirements of on board instructor stations and multiwindow visual display systems. There has also been a tendency toward increased acceleleration performance requirements in all axes of motion due to the general improvements in vehicle performance over the years. These two factors have invalidated the assumptions that the structural components of a motion system act as rigid elements, and that actuator performance is unaffected by load variations. The result has been that prior motion system designs have had to suffer performance degradation to eliminate the generation of false motion cues. Either the acceleration levels had to be reduced, or electronic compensation networks or computer programmed compensation equations had to be incorporated which resulted in a lower system frequency response.

The present invention proposes a novel geometric arrangement or actuators which mechanically minimizes these system noise problems and will simplify or eliminate the need for control compensation. Structural spring problems are automatically reduced by the fact that the present invention is of the synergistic type, having only one movable platform and six linear actuators. Dynamic and static load variation problems are minimized by an appropriate arrangement of actuator attachment points and lines of action, wherein movement along or about any axis of the platform will transmit minimal or no forces and moments into other axes of motion. This novel geometric arrangement may not provide the optimal solution to all motion simulation problems, but does not claim to provide a significant improvement in motion fidelity over prior known systems.

SUMMARY OF THE INVENTION

The present invention is an apparatus for imparting controlled accelerations in six degrees of freedom to a platform which is capable of carrying a simulated vehicle student station, or the like. It can be categorized as a synergistic type motion system, comprising a movable platform which is supported and controlled by six linear actuators. The novelty of this invention lies in its geometric ensemble of actuators, three of which form a tetrahedron. The apex of this tetrahedron assembly is attached to a support base and held fixed in space while the base points of its tripod arms are attached to the movable platform and move with it. This tetrahedron assembly provides three of the six degrees of freedom to the system.

It is the principal object of the present invention to improve the fidelity of motion simulation by minimizing the static and dynamic load variations on the system actuators by the novel geometric arrangement of those actuator attachment points on a movable platform and on grounds supports.

Another object of the present invention is to improve the simultaneous motion capability of mechanically failsafe six degree of freedom synergistic type motion systems. This is provided by an efficient geometric arrangement of system actuators which is still compliant with the geometric constraints of the foregong object.

It is another object of this invention to provide a geometric arrangement of actuators which is substantially different from prior systems in that it will exhibit different clearances on and about the moving platform. This difference provides the present motion system with a capability of accommodating new varieties of visual display systems or cockpit shells.

BRIEF DESCRIPTION OF THE DRAWINGS

An understanding of the operation and objects of the present invention will become apparent from the detailed description of the preferred embodiment when taken in conjunction with the accompanying three sheets of drawings in which:

FIG. 2 is a front elevation of FIG. 1 showing clearly the fourth and fifth linear actuators in a vertical orientation supporting the movable platform and cockpit, as well as a sixth linear actuator in a horizontal orientation with one end attached to the platform and the other end attached to a raised support base;

FIGS. 5 through 10 inclusive are diagraminatic illustrations of the six degrees of freedom of movement, in which FIG. 5 shows how movement along the longitudinal degree of freedom is provided by the fixed apex tetrahedral assembly of actuators;

FIG. 6 shows the tetrahedral assembly operated to provide pitch movement to the platform;

FIG. 7 shows a plan view in which the tetrahedron of assembly actuators provide yaw movement to the platform;

FIG. 8 shows the fourth and fifth linear actuators affording an up and down movement to the platform;

FIG. 9 shows how the fourth and fifth linear actuators afford roll movement to the platform; and FIG. 10 shows the sixth linear actuator exerting a side to side motion to the platform.

DESCRIPTION OF THE PREFERRED EMBODIMENT

Figure 1:
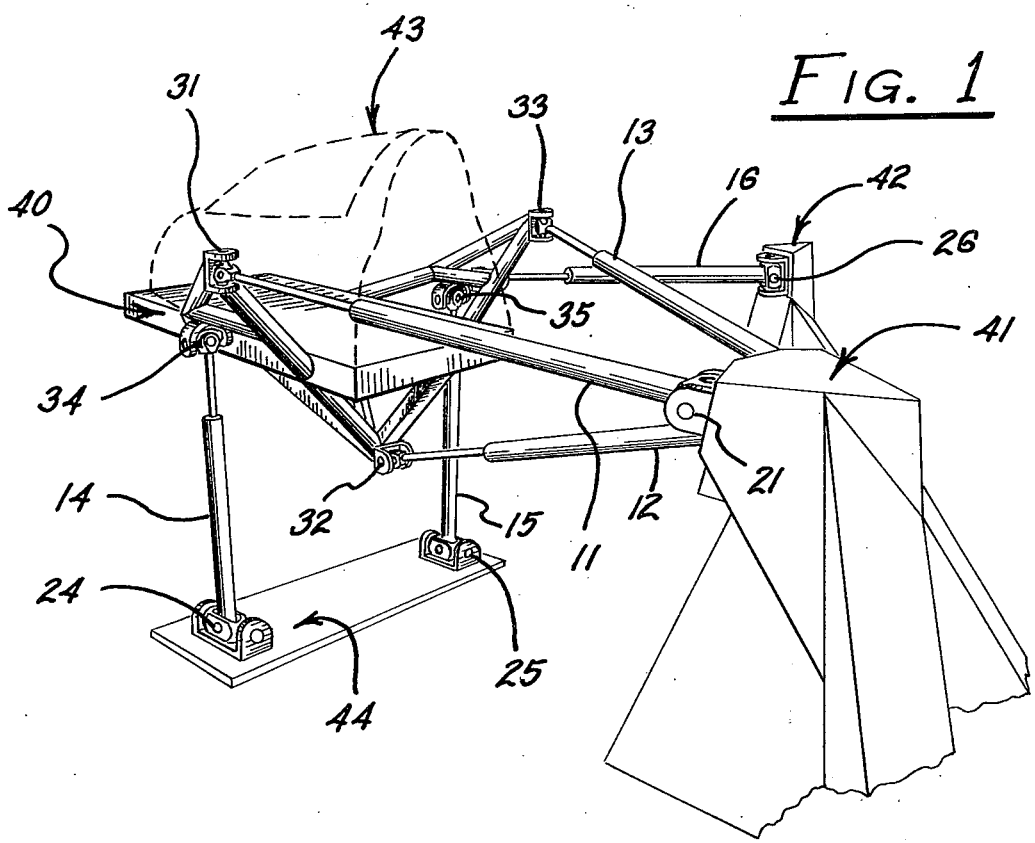
Figure 2:
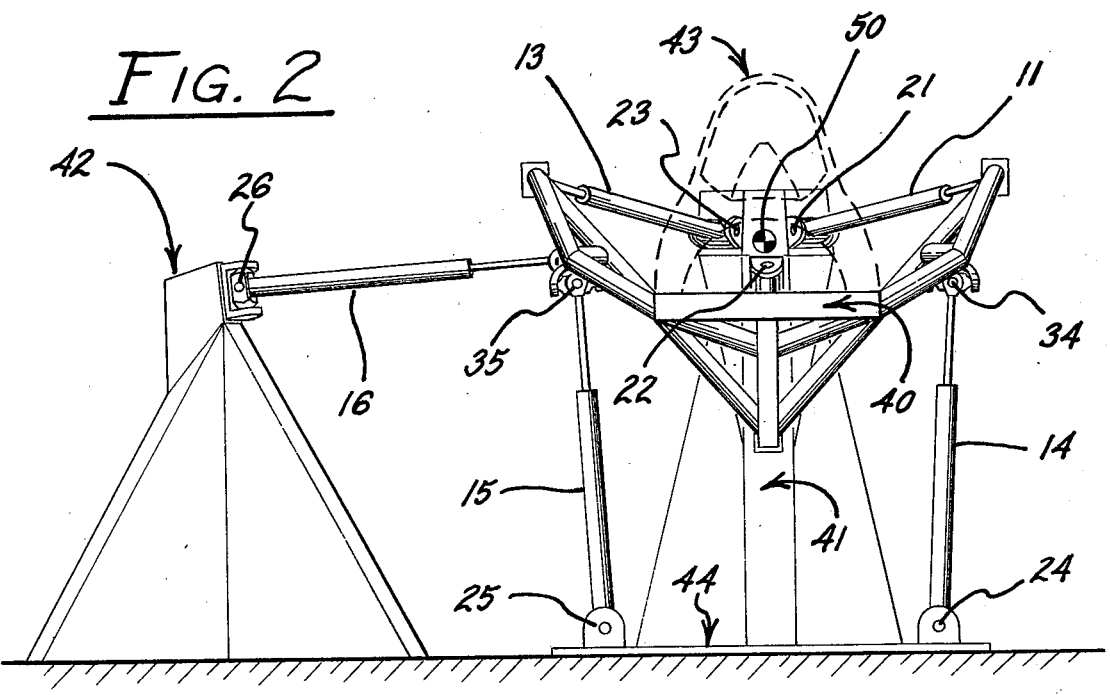
FIG. 2 is a perspective view of a six degree of freedom motion simulating apparatus as viewed from behind, above and from the port side, illustrating the elements and arrangement of the novel fixed apex tetrahedron assembly of actuators for moving a platform supporting a simulated vehicle cockpit.
Figure 3:
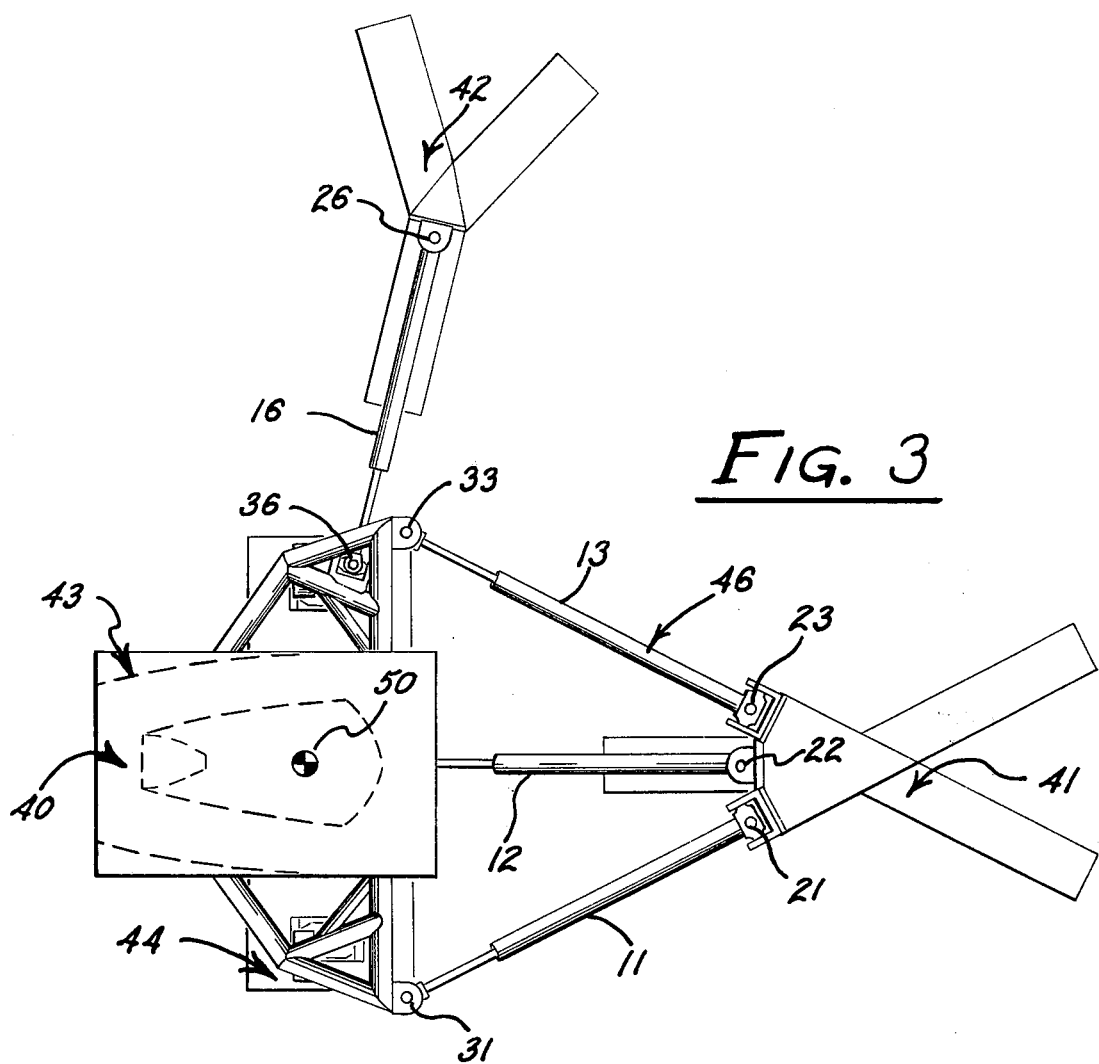
FIG. 3 is a side elevational view of the apparatus as seen from the righthand side of FIG. 2.
Figure 4:
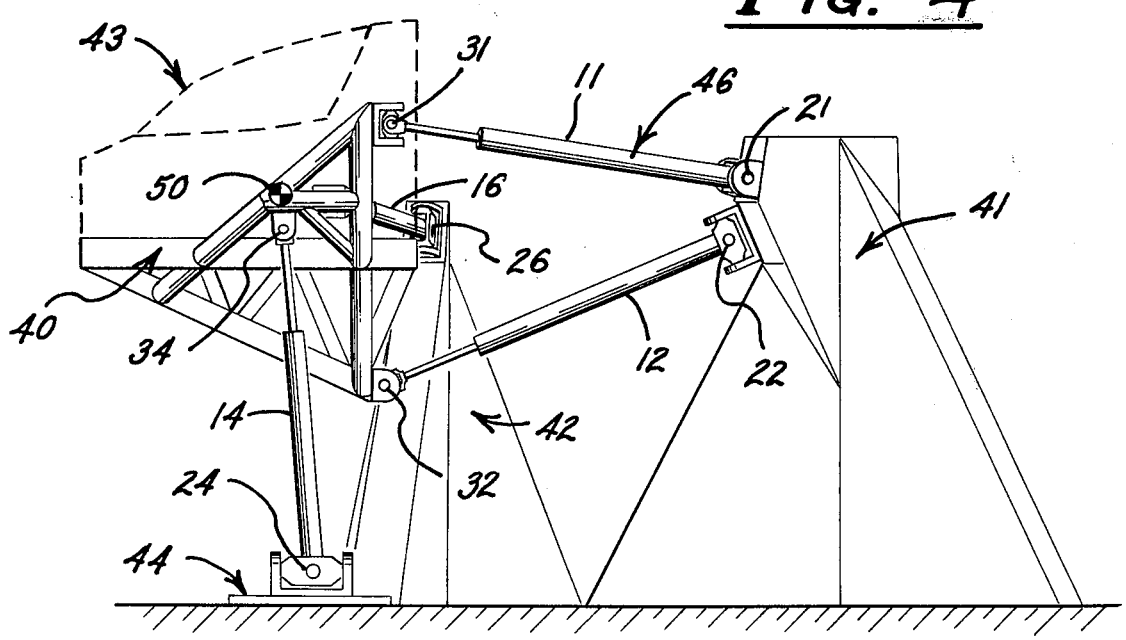
FIG. 4 is a top plan view of the apparatus as seen from above in FIG. 3.

Referring to FIGS. 1, 2, 3 and 4 in detail, the present invention comprises a movable rigid platform 40, six linear actuators 11, 12, 13, 14, 15 and 16, six moving universal joints 31, 32, 33, 34, 35 and 36, six stationary universal joints 21, 22, 23, 24, 25 and 26, two raised structural base supports 41 and 42, and a base pad 44.

It should be noted that the structural members of the moving platform 40, which supports the simulated cab or vehicle student station 43, provides a plane on which is formed a triangular frame work conforming substantially to the base triangle of a tetrahedron assembly 46. This tetrahedron assembly 46 consists of three of the linear actuators 11, 12 and 13 and the connection of their stationary universal joints 21, 22 and 23, respectively, to one of the fixed raised structural supports 41 defining the apex of the tetrahedron assembly 46. The moving joints 31, 32 and 33 of the linear actuators 11, 12 and 13 are mounted on the triangular framework of the moving platform structure 40. Two of the other linear actuators 14 and 15 have their moving joints 34 and 35, respectively, connected to laterally opposite sides of the platform structure 40 and their stationary universal joints 24 and 25 mounted on the base pad 44 previously mentioned. The remaining or sixth linear actuator 16 has its moving joint 36 secured to one side of the moving platform structure 40 and the stationary universal joint at its opposite end mounted on the other fixed raised support base 42. The movable platform 40 can be any suitable structure made from any material or construction. It may be of any shape or size provide that it be fairly rigid, that it retains the approximate geometric relationship of the moving joints 31, 32, 33, 34, 35 and 36, and that it be capable of carrying a simulated vehicle student station 43, or the like.

The six actuators 11, 12, 13, 14, 15 and 16 are used to support and control the movement of the platform 40 and its payload 43. The actuators can be hydromechanical devices, electromechanical devices, or the like, capable of extending and retracting along a linear or near linear axis and imparting a controlled push and pull force along that axis. A typical actuator may consist of a hydraulic ram, a fluid control valve, a positional followup element, and associated plumbing and wiring, which is capable of closed loop control. See for example a similar control in U.S. Pat. No. 3,295,224 to Cappel. Typical control signals to the actuators will be computed in a digital computer, or the like, as a function of the simulated vehicular equations of motion as shown and described in U.S. Pat. No. 3,304,628 to Kaplan.

The six moving universal joints 31, 32, 33, 34, 35 and 36, are affixed to the moving platform 40 and to the moving ends of the actuators 11, 12, 13, 14, 15 and 16, respectively. The function of these joints is to allow the actuators to pivot freely as the moving platform 40 is commanded to various attitudes and positions. The joints can be three degree of freedom joints, or two degree of freedom joints provided the linear actuators can releave torsion in the third degree of freedom. Ideally, these joints should only transmit axial forces to and from the actuators, releaving all moments or torsions. Any suitable material, shape, or size can be used, provided these joints are fairly rigid, exhibit minimal or no backlash or play, and can meet thee relative angulaar excursion requirements of the attached actuators.

The six stationary universal joints 21, 22, 23, 24, 25 and 26 are affixed to the ground or grounded base supports. Three of these universal joints 21, 22 and 23 comprising the apex of the tetrahedron assembly 46, are attached to the raised support base 41, and are affixed to the stationary ends of actuators 11, 12 and 13, respectively. Two of the stationary universal joints 24 and 25 are attached to the base pad 44, and to the stationary ends of actuators 14 and 15, respectively. The remaining stationary universal joint 26 is attached to the raised base support 42 and is affixed to the stationary end of actuator 16. These stationary joints function much like the moving joints in that they allow the actuators to pivot freely as the platform 40 moves to various attitudes and positions. Similarly, these joints can either be three degree of freedom joints, or two degree of freedom joints provided that the linear actuators can releave the torsion in the third degree of freedom. The shape, size or material used for these joints are not limited, provided that the joints are fairly rigid, exhibit minimal backlash or play and allow the actuators to pivot freely to all possible angular positions demanded by the movement of the platform 40.

Figure 8:
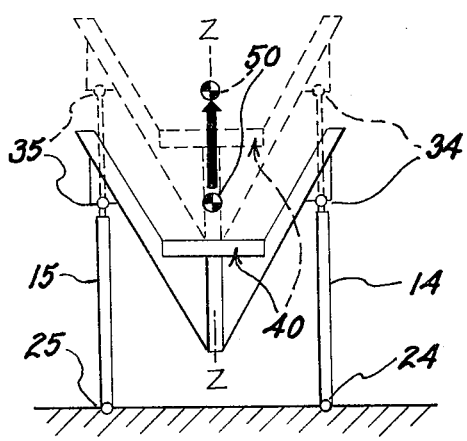
Figure 9:
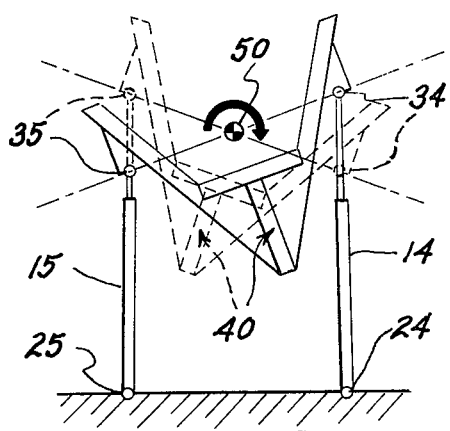
Figure 10:
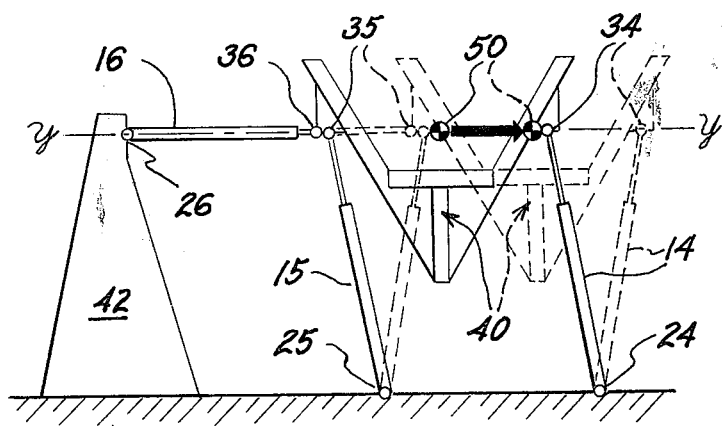

The capability of the present invention to provide controlled movement of platform 40 and its payload in all six degrees of freedom can best be described by considering one degree of freedom at a time and using simplified drawings as illustrated diagrammatically in FIGS. 5,6,7,8,9 and 10. The six degrees of freedom discussed herein comprise pitch, roll, yaw, longitudinal, lateral and vertical. These degrees of freedom can be defined with respect to a number of different axis systems. The axis system chosen for this discussion is an orthogonal $x,y,z$ axis system whose origin is coincident with the center of gravity 50 of the moving platform 40 and payload combination. In this orthogonal axis system the $x$ axis is essentially parallel to the longitudinal axis of the simulated cockpit 43, (FIG. 5); the $z$ axis is perpendicular to the $x$ axis and lies essentially vertical when the moving platform 40 is level (FIG. 8) and the $y$ axis is perpendicular to both the $x$ and $z$ axes and lies essentially horizontal when the moving platform is level (FIG. 10). Translational movement along the $x$, $y$ and $z$ axes of this coordinate system correspond to motion capability of longitudinal, lateral and vertical degrees of freedom, respectively. Rotational movement about the $x$, $y$, and $z$ axes of this coordinate system correspond to motion capability in the roll, pitch and yaw degrees of freedom, respectively.

Figure 6:
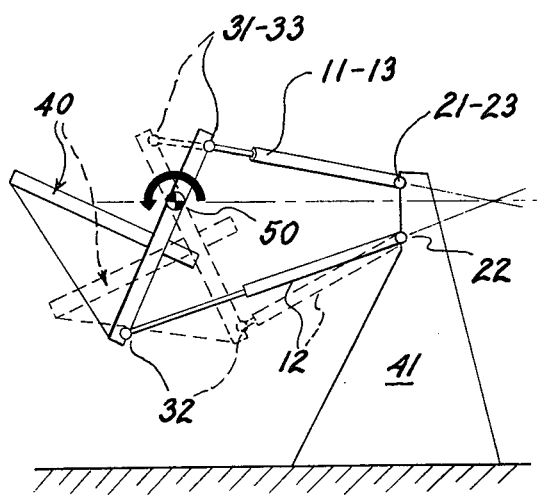
Figure 5:
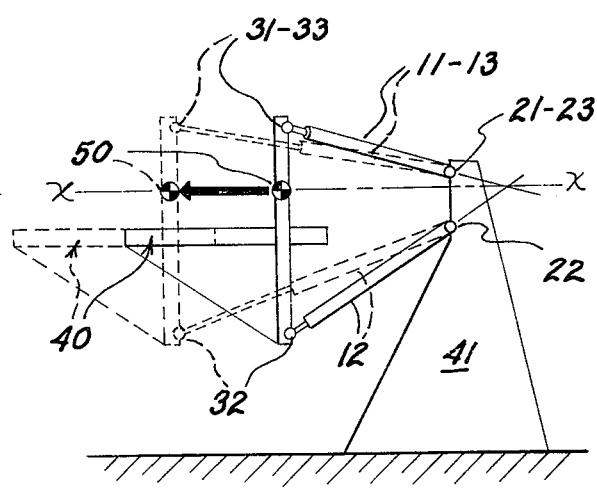
Figure 7:
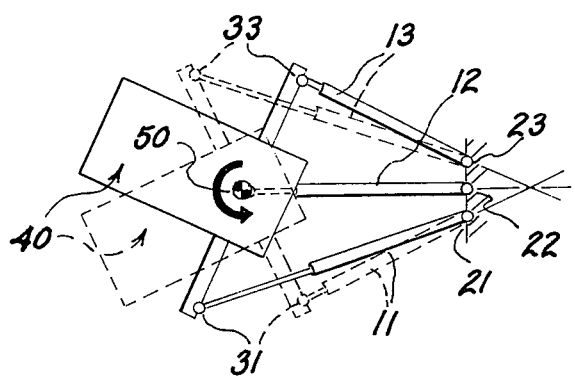

Movement in the longitudinal, pitch and yaw degrees of freedom FIGS. 5, 6 and 7, respectively, are provided by coordinated action from actuators 11, 12, and 13, which form a tetrahedral geometric assembly. Referring to FIG. 6, when actuator 12 is retracted and actuators 11 and 13 are extended, the movable platform 40 will pitch nose down about the axis $y$. Likewise, when actuator 12 is extended and actuators 11 and 13 are retracted, the platform will pitch nose up. It should be noted that the application of forces by actuators 11, 12 and 13 to provide pure pitch motion will not cause forces or moments to be generated or transmitted to other degrees of freedom.

Referring to FIG. 7, if actuator 12 is held at a fixed extention, actuator 13 is retracted and actuator 11 is extended, the platform 40 will yaw nose right about the axis $z$. Similarly, if actuator 13 is extended and actuator 11 is retracted, the platform will yaw nose left. The manner in which actuators 11, 12 and 13 provide pure yaw motion to the platform and its payload is such that minimal forces and moments are generated or transmitted to the other degrees of freedom.

With reference to FIG. 5, longitudinal motion along the axis $x$ is provided by the coordinated extension of all three of the tetrahedral assembly of actuators 11, 12, and 13 if forward movement of the platform is desired. Likewise, a coordinated retraction of actuators 11, 12 and 13 will provide movement of the platform in the aft direction along axis $x$. Again, it should be noted that the generation of movement in the longitudinal degree of freedom generates or transmits minimal or no forces or moments to the other degrees of freedom.

Roll and vertical motion of the moving platform 40 are provided by the coordinated action of two vertically oriented actuators 14 and 15. Referring to FIG. 8, when both actuators 14 and 15 are extended the platform is forced to move vertically upward. If both actuators 14 and 15 are retracted, the platform translates vertically downward. The application of accelerations in this vertical degree of freedom generates or transmits minimal forces or moments into the other degree of freedom. With reference to FIG. 9, to provide pure right wing down roll about the axis $x$ actuator 14 will extend and actuator 15 will simultaneously retract. Likewise, right wing up roll is provided by actuator 14 retracting and actuator 15 simultaneously extending. As in the previously described degrees of freedom, the application of forces to provide roll acceleration will generate or transmit minimal or no forces or moments into the other degrees of freedom.

The ability of the present invention to provide lateral motion to the moving platform 40 and its payload can be understood with reference to FIG. 10. Movement of the platform to the left is provided by actuator 16 retracting. Likewise, platform movement to the right is provided by actuator 16 extending. The application of forces upon the moving platform 40 and its payload is through the center of gravity 50, and thus will generate or transmit minimal or no forces or moments into the other degrees of freedom.

Thus far, only one degree of freedom of motion at a time has been considered. It should be obvious from the geometry that simultaneous motion in any combination of all six freedoms of motion is possible. It should also be noted that axial movement of the system actuators are approximately in line with the movement of the platform along and about its orthogonal axes $x$, $y$ and $z$. This geometric feature yields a high efficiency of simultaneous motion. Other six degree of freedom synergistic type motion systems, such as those invented by K.L. Cappel, reference U.S. Pat. No. 3,295,224 and D.D. Roberts et al., reference U.S. Pat. No. 3,529,354, exhibit efficient independent motion along any single axis, but do not exhibit efficient simultaneous motion in multiple axes. This is due to the fact that the axial movement of the actuators of these systems do not coincide with the movement of the center of mass, i.e., the payload and platform along or about its orthogonal axes.

Reference is again made to the diagrammatic illustration of the six basic freedoms of motion in FIGS. 5 through 10 inclusive, wherein all movements of the platform 40 and its payload have been defined as being along and about set of orthogonal axes whose origin is coincident with the moving center of gravity 50. The most ideal arrangement for minimal noisome operation would be to place the center of gravity 50 along a line defined by the locus of points passing through the apex of the tetrahedral assembly of actuators and through the centroid of the base triangle of the tripod of such assembly. In addition, the center of gravity 50 should lie midway between the two vertical supporting actuators 14 and 15. Small deviations from this ideal arrangement will not significantly degrade operational performance. However, if the center of gravity is substantially displaced from its ideal location and either the moving payload is heavy in weight or the accelerations required to be imparted to the moving payload are great, degraded performance is to be expected.

The present invention has been described primarily with respect to its geometric features, without reference to other equipment and elements comprising a complete motion simulator. Such equipment as hydraulic power supplies, plumbing, accumulators, safety devices, leveling and locking devices, boarding ramps, electronic control circuitry, computer control lines, electrical power lines, and the like, are all necessary elements of a complete motion simulator. However, specific mention and discussion of these elements would have departed from the understanding of the objectives of the proposed geometry. The present invention has also been described with respect to a specific embodiment. It should be realized that the novel geometric concepts can be embodied in many different forms and orientations.

What I claim is:

1. A motion simulator capable of imparting motion to a payload in at least three degrees of freedom, comprising in combination:
   a. a movable platform capable of supporting such a payload and in combination with said payload providing a center of mass, upon which can be defined an orthogonal X, Y and Z coordinate axis system, corresponding to a longitudinal, lateral and vertical reference axis respectively;
   b. three substantially separated points of support on said platform defining the corners of a triangular base, said base when oriented in a substantially vertical plane, the perpendicular to said plane lies substantially parallel to the longitudinal axis defined at the center of mass of said movable platform and payload combination;
   c. a first fixed support base in a second plane spaced substantially aft of said movable platform;
   d. three generally coincident points of support on said fixed support base in proximity to each other and the longitudinal axis extended from the center of mass on said movable platform; and
   e. a first means for imparting substantially pure longitudinal forces and displacements to the center of mass of said combined movable platform and payload, and imparting substantially pure rotational moments and displacements in the pitch and yaw degrees of motion about said center of mass, said means comprising three extensible and retractable actuators each having one of its ends connected to a respective one of the generally coincident points on said fixed support base and its opposite end connected to a respective one of the separated points of support on said movable platform, to thereby generally form a tetrahedral arrangement of actuators having its base defined by the triangular base in said first plane on said movable platform and its apex defined by the three generally coincident points of support on said first fixed support base.

2. A motion simulator in accordance with that of claim 1, including in combination:
   a. a second fixed support base spaced laterally from said movable platform, defining a single fixed point of supportt in a third plane;
   b. a fourth point of support located on said movable platform; and
   c. a second means for imparting substantially pure lateral forces and displacements to the center of mass of said combined movable platform and payload comprising, a fourth extensible and retractable actuator having one of its ends connected to said single fixed point of support on said second fixed support base and its opposite end connected to said fourth point of support on said movable platform.

3. A motion simulator in accordance with that of claim 2, comprising in combination:
   a. a third fixed support base vertically spaced from said movable platform, defining two points of support in a fourth plane;
   b. a fifth and sixth point of support on laterally opposite sides of said movable platform; and
   c. a third means for imparting substantially pure vertical forces and displacements to the center of mass of said combined movable platform and payload and imparting substantially pure roll moments and displacements about said center of mass in conjunction with the pitch, yaw and longitudinal motions provided by the tetrahedral arrangement of said first three actuators and the lateral motion afforded by said fourth actuator, comprising, a fifth and sixth extensible and retractable actuator each having one of its ends connected to a respective one of said two laterally opposite points of support on said movable platform and its opposite end connected to a respective one of said fifth and sixth points of support on said third fixed support base, resulting in a full complement of six degrees of freedom to said platform and payload.

4. A motion simulator in accordance with that of claim 1, including in combination:
   a. a second fixed support base vertically spaced from said movable platform, defining two points of support in a third plane;
   b. a fourth and fifth point of support on laterally opposite sides of said movable platform; and
   c. a second means for imparting substantially pure vertical forces and displacements to the center of mass of said combined movable platform and payload and imparting substantially pure roll moments and displacements about said center of mass in conjunction with the pitch, yaw and longitudinal motions afforded by said tetrahedral arrangement of actuators, thereto comprising, a fourth and fifth extensible and retractable actuator each having one of its ends connected to a respective one of said two laterally opposite points of support on said movable platform and its opposite end connected to a respective one of said fourth and fifth points of support on said second fixed support base.

5. A motion simulator capable of imparting motion to a payload in at least three degrees of freedom, comprising in combination:
   a. a movable platform capable of supporting such a payload and in combination with said payload providing a center of mass, upon which can be defined an orthogonal X, Y, and Z coordinate axis system, corresponding to a longitudinal, lateral and vertical reference, respectively;
   b. three substantially separated points of support on said platform defining the corners of a triangular base, said base being oriented in a substantially vertical plane, wherein the perpendicular to said plane defined at the centroid of said triangular base coincides substantially with the longitudinal axis defined at the center of mass of said movable platform and payload combination;
   c. a first fixed support base in a second plane spaced substantially aft of said movable platform;
   d. three generally coincident points of support on said support base in proximity to each other about the longitudinal axis projected from the center of mass on said movable platform; and d. a first means for imparting substantially pure longitudinal forces and displacements to the center of mass of said combined movable platform and payload, and imparting substantially pure rotational moments and displacements in the pitch and yaw degrees of motion about said center of mass, said means comprising three extensible and retractable actuators each having one of its ends connected to a respective one of the generally coincident points on said fixed support base and its opposite end connected to a respective one of the separated points of support on said movable platform, to thereby generally form a tetrahedral arrangement of actuators having its base defined by the triangular base in said first plane on said movable platform and its apex defined by the three generally coincident points on said fixed support base.

6. A motion simulator in accordance with that of claim 5 including in combination:
   a. a second fixed support base laterally spaced from said movable platform, defining a single point of support in a third plane;
   b. a fourth point of support laterally located on said movable platform between the center of mass of said combined movable platform and payload and the single point of support on said second fixed support base; and
   c. a second means for imparting substantially pure lateral forces and displacements to the center of mass of said combined movable platform and payload in conjunction with the pitch, yaw and longitudinal motions afforded by said tetrahedral arrangement of actuators comprising, a fourth extensible and retractable actuator having one of its ends connected to said single point of support on said second fixed support base and its opposite end connected to said fourth point of support on said movable platform.

7. A motion simulator in accordance with that of claim 6, comprising in combination:
   a. a third fixed support base vertically spaced from said movable platform, defining two spaced points of support in a fourth plane;
   b. a fifth and a sixth point of support laterally opposite sides of said movable platform; and
   c. a third means for imparting substantially pure vertical forces and displacements to the center of mass of said combined movable platform and payload and imparting substantially pure roll moments and displacements about said center of mass in conjunction with the pitch, yaw and longitudinal motions afforded by said tetrahedral arrangement of three actuators and the lateral motion provided by said fourth actuator comprising, a fifth and sixth extensible and retractable actuator each having one of its ends connected to a respective one of said two laterally opposite points of support on said movable platform and its opposite end connected to a respective one of said fifth and sixth point of support on said third fixed support base, resulting in a full complement of six degrees of freedom to said platform and payload.

8. A motion simulator in accordance with that of claim 5, including in combination:
   a. a second fixed support base vertically spaced from said movable platform, defining two spaced points of support in a third plane;
   b. a fourth and fifth point of support on laterally opposite sides of said movable platform; and
   c. a second means for imparting substantially pure vertical forces and displacements to the center of mass of said combined movable platform and payload and imparting substantially pure roll moments and displacements about said center of mass in conjunction with the pitch, yaw and longitudinal motions provided by said tetrahedral arrangement of actuators comprising, a fourth and fifth extensible and retractable actuator each having one of its ends connected to a respective one of said two laterally opposite points of support on said movable platform and its opposite end connected to a respective one of said fourth and fifth spaced points of support on said second fixed support base.

* * * * *